United States Patent [19]

Matsuda et al.

[11] 3,909,620

[45] Sept. 30, 1975

[54] TIME CONTROLLED SWITCHING SYSTEM WITH OVERRIDE CONTROL OF MANUAL OPERATION

[75] Inventors: Hirotoshi Matsuda; Osamu Sugita, both of Kawasaki; Yuji Inoue, Yokohama, all of Japan

[73] Assignee: New Nippon Electric Co., Ltd., Osaka, Japan

[22] Filed: Oct. 29, 1973

[21] Appl. No.: 410,524

[30] Foreign Application Priority Data

Nov. 4, 1972 Japan .............................. 47-110447
Nov. 14, 1972 Japan .............................. 47-18038

[52] U.S. Cl. ............ 307/293; 307/247 A; 328/129; 328/131; 328/72

[51] Int. Cl.² ...................... H03K 5/13; H03K 17/00

[58] Field of Search ........ 307/293, 247 A; 328/129, 328/130, 131, 48, 72–74

[56] References Cited

UNITED STATES PATENTS

| | | | |
|---|---|---|---|
| 2,493,627 | 1/1956 | Grosdoff | 328/129 |
| 2,970,226 | 1/1961 | Skelton et al. | 307/293 |
| 3,304,415 | 2/1967 | Connolly et al. | 328/129 |
| 3,327,224 | 6/1967 | Mauchel | 328/129 |

*Primary Examiner*—Stanley D. Miller, Jr.
*Attorney, Agent, or Firm*—Charles W. Helzer

[57] ABSTRACT

The control system comprises a combination of a timer device and a switching circuit. The timer device comprises a clock circuit for dividing a signal of a predetermined duration into a plurality of signals on the basis of time division and for sequentially producing the plurality of divided signals at a plurality of output terminals, a time setting circuit for setting a desired time, and circuit means for sequentially comparing the time which is set by the time setting circuit with the plurality of output signals from the clock circuit so as to produce an output when the logical condition represented by the clock circuit coincides with or becomes just opposite to the logical condition of the time setting circuit. The switching circuit comprises an automatic switching circuit which is connected to receive the output of the timer device, a first holding circuit, a second holding circuit, a manually operated switch and a load switch which are constructed and arranged such that when the automatic switching circuit is operated, the first holding circuit is controlled by the operation of the manually operated switch. Upon the automatic switching circuit being operated, the manually operated switch is maintained in the inoperative condition by the second holding circuit, that the first holding circuit is controlled by the operation of the automatic switching circuit, and that the load switch is controlled by the first holding circuit.

14 Claims, 3 Drawing Figures

TIME CONTROLLED SWITCHING SYSTEM WITH OVERRIDE CONTROL OF MANUAL OPERATION

BACKGROUND OF THE INVENTION

This invention relates to a timer device and a switching circuit and more particularly to a combination of a timer device and a switching circuit. Electrical connections to a source of supply of certain electric machines and apparatus generally are automatically controlled by a timer device or by a manual switch. The present invention provides a switching circuit which can be controlled manually or by a control signal supplied by a timer.

SUMMARY OF THE INVENTION

It is an object of this invention to provide a novel timer device utilizing a clock circuit that provides a clock signal that represents an interval of known time duration and which is divided into a plurality of definite interval time signals by logical outputs on the basis of time division.

Another object of this invention is to provide a novel switching circuit capable of controlling a load in response to a control signal or to the operation of a manual switch.

Still another object of this invention is to provide a control system comprising a combination of the timer device and the switching circuit described above.

According to one aspect of this invention there is provided a timer device comprising a clock circuit for dividing a signal of a predetermined duration into a plurality of signals on the basis of time division, and for sequentially producing the plurality of divided signals at a plurality of output terminals, a time setting circuit for setting a desired time, and circuit means for sequentially comparing the time which is set by the time setting circuit with the plurality of output signals from the clock circuit so as to produce an output when the logical condition represented by the clock circuit coincides with or becomes just opposite to the logical condition of the time setting circuit.

According to another aspect of this invention, there is provided a switching circuit for use with the above-described timer device comprising an automatic switching circuit which operates in response to a control signal, a first holding circuit, a second holding circuit, a manually operated switch, and a load switch. The switching circuit is constructed and arranged such that when the automatic switching circuit is inoperative, the first holding circuit is controlled by the operation of the manually operated switch to control operation of the load switch; and when the automatic switching circuit is conditioned to control operation of the load switch, the manually operated switch is maintained in the inoperative condition by the second holding circuit, the first holding circuit is controlled by the operation of the automatic switching circuit, and the load switch is controlled by the first holding circuit.

According to still further aspect of this invention the timer device and the switching circuit described above are combined such that the output from the timer device is supplied to the automatic switching circuit of the switching circuit to act as the control signal.

DESCRIPTION OF THE PREFERRED EMBODIMENT

Figure 1:
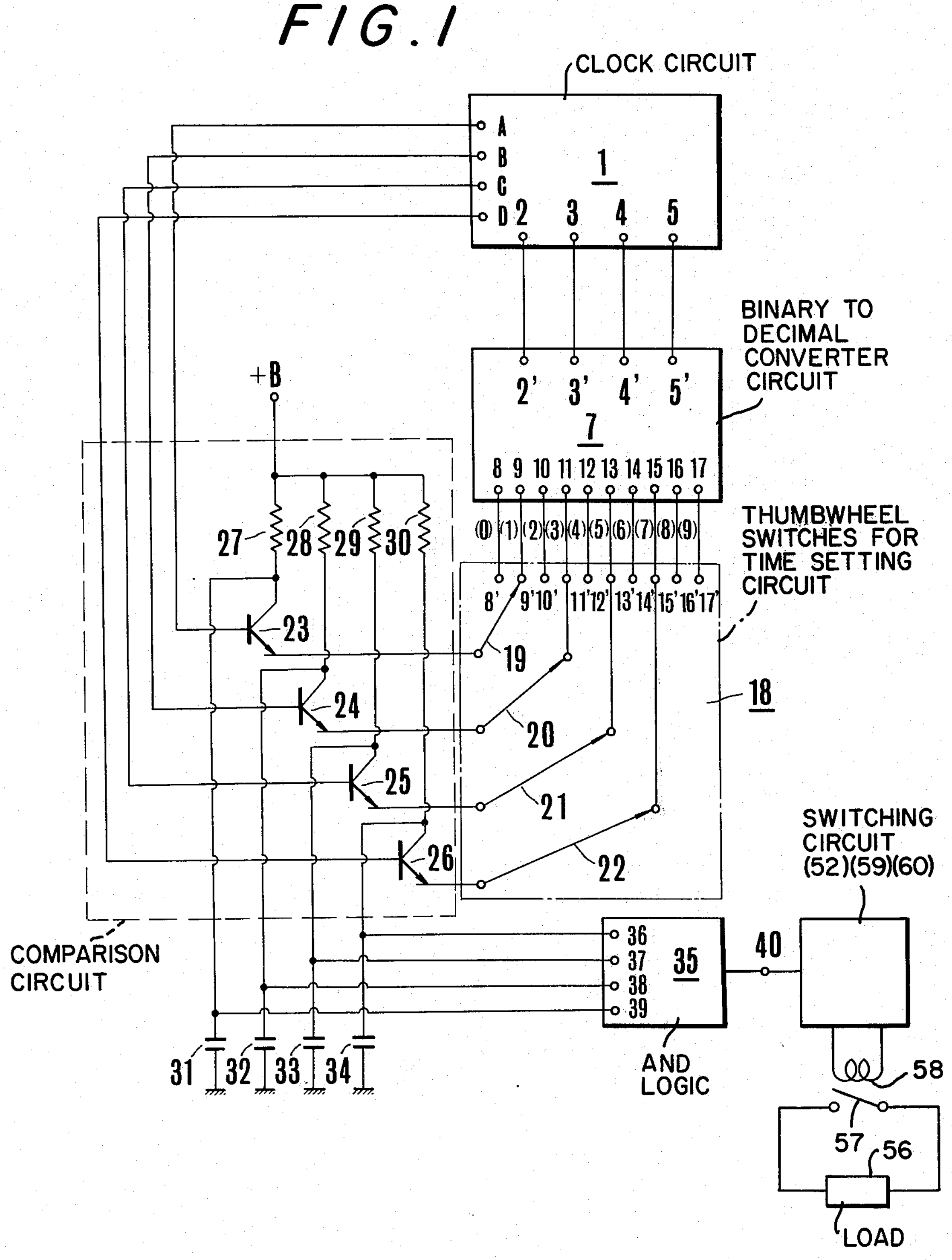
FIG. 1 is a functional block diagram showing the construction of a control system including a timer device and switching circuit embodying the invention.

A timer device embodying the invention and shown in FIG. 1 comprises a clock circuit 1 including logical output terminals 2, 3, 4 and 5 which represent an interval over a definite time period by a decimal system on the basis of time division, and output terminals A, B, C and D for the signals associated with signals which determine the order of the signals appearing at output terminals 2, 3, 4 and 5. Clock circuit 1 may be comprised by a conventional, commercially available, monolithic MOS integrated circuit such as the MM5311 digital clock manufactured and sold by the National Semiconductor Corporation as described in that Corporations's data bulletin issued June, 1972. The outputs from these output terminals are coupled to the input terminals 2', 3', 4' and 5', respectively, of a binary to decimal converter 7 which further includes output terminals 8, 9, . . . 17 corresponding to digits 0 to 9 of the decimal system. Binary to decimal converter 7 may comprise a conventional, commercially available, monolithic MOS integrated circuit such as the DM7442 BCD to decimal decoder manufactured and sold by the National Semiconductor Corporation and described in the National Semiconductor Corporation's Semiconductor Handbook at Pages 1–31. There is provided a time setting circuit 18 which Binary comprise conventional thumbwheel switches including movable contacts 19, 20, 21 and 22 which are selectively thrown to desired ones of input terminals 8', 9' . . . 17' corresponding to the output terminals 8, 9 . . . 17 of the converter 7. In order to determine whether the logical condition represented by the time setting circuit 18 coincides or not with the logical condition of the output terminals 8, 9 . . . 17 of the converter 7 represented by the logical condition of the clock circuit 1, there is provided comparison circuit means comprised by transistors 23, 24, 25 and 26. The emitter electrodes of these transistors are connected to the movable contacts 19, 20, 21 and 22, respectively, of the time setting circuit 18, whereas the base electrodes are supplied from output terminals A, B, C and D of the clock circuit 1 signal which determines the order. Resistors 27, 28, 29 and 30 and capacitors 31, 32, 33 and 34, both connected to the collector electrodes of transistors 23 through 26 form integrating circuits which function to convert signals divided on the time division basis into simultaneous signals. The collector electrodes of the transistors 23 through 26 are also connected to a logical circuit 35 which is constructed such that it will produce an output at the output terminal 40 only when its input terminals 36, 37, 38 and 39 are supplied with inputs at the same time. The logical circuit 35 may comprise a conventional, commercially available, monolithic MOS integrated circuit AND gate such as the DM7453 manufactured and sold by the National Semiconductor Corporation and described in their Handbook at pages 1–35.

The timer device described above operates as follows. For example, when the condition of the timer device 1 corresponds to a time "13 o'clock 46 minutes," the signal is required to continue for only one minute, corresponding to the least significant digit. If the least significant digit corresponds to one second, the signal is required to continue for one second. In the former case, the signal is divided into 4 signals, each continuing for 15 seconds, on the time division basis and these four signals are sequentially supplied to output terminals 2, 3, 4 and 5 whereas signals as shown in FIGS. 2A through 2D associated with the time division are supplied to output terminals A, B, C and D. More particularly, signals corresponding to "13 o'clock 46 minutes" are sustained from time $t_1$ to time $t_5$ in FIG. 2. During the interval $t_1 - t_2$ in which the signal shown in FIG. 2A appears at the output terminal A, a logical output 0001 representing a digit 1. of the 10 hours unit appears at the four output terminals 2, 3, 4 and 5. During the interval $t_2 - t_3$ in which the signal shown in FIG. 2B appears at the output terminal B, a logical output 0011 representing the digit 3 of the one hour unit appears at the output terminals 2, 3, 4 and 5. In the same manner, during the interval $t_3 - t_4$ in which the signal shown in FIG. 2C appears as output terminal C, a logical output 0100 representing the digit 4 of the 10 minutes unit appears. Finally, during the interval $t_4 - t_5$ in which the signal shown in FIG. 2D appears at output terminal D, a logical output 0111 representing the digit 6 of the one minute unit appears at the output terminals 2, 3, 4 and 5. These output signals which appear sequentially at the output terminals 2, 3, 4 and 5, are sequentially converted into decimal number, by the action of the binary to decimal converter 7 to produce outputs at output terminals 9, 11, 12 and 16 of the converter 7 which represent respectively decimal digits 1, 3, 4 and 6.

In the time setting circuit 18, movable contacts 19, 20, 21 and 22 respectively setting times of 10 hours unit, one hour unit, 10 minutes unit and one minute unit are manually thrown to output terminals 9, 11, 13 and 15 representing a time "13 o'clock 57 minutes," for example.

Since signals shown in FIGS. 2A through 2D are applied in a regular time sequence to the respective base electrodes of transistors 23, 24, 25 and 26 from the output terminals A, B, C and D of the clock circuit 1 these transistors will be rendered conductive only when the logical condition of the converter 7 which is determined by the logical condition of the clock circuit 1 coincides with that of the time setting circuit 18. This occurs only and when the negative pulses appearing at the output terminals of the converter 7 are applied to respective emitter electrodes of transistors 23, 24, 25 and 26 via movable contacts 19, 20, 21 and 22, respectively of the time setting circuit 18.

As described above when the condition of the clock circuit 1 represents a time "13 o'clock 46 minutes" and that of the time setting circuit 18 a time "13 o'clock 57 minutes", the digits of the 10 hours unit and one hour unit of both conditions coincide with each other. Hence, the pulses appearing at output terminals 9 and 11 of the binary to decimal converter 7 are applied through movable contacts 19 and 20 to the emitter electrodes of the transistors 23 and 24 which operate to discriminate digits of 10 hours unit and one hour unit, whereby these transistors are rendered conductive successively. However, since the digits of the 10 minutes unit and one minute unit do not coincide with each other, movable contacts 21 and 22 are connected to output terminals 13 and 15 of the converter 7 on which no output is applied. Hence, no pulse is supplied from the output terminals 13 and 15 of the converter 7 to the emitter electrodes of transistors 25 and 26 which function to discriminate digits of 10 minutes unit and one minute unit, thus maintaining these transistors in their non-conductive condition. For this reason, while inputs are impressed upon input terminals 38 and 39 of the logical circuit 35, no input is impressed upon the input terminals 36 and 37 thereof, whereby no output is produced at the output terminal 40.

In the explanation above, the logical circuit 35 operates as an AND-gate-comprising four input terminals and one output terminal, but basically this logical circuit 35 may be a NAND-gate.

As the time elapses until the condition of the clock circuit 1 represents 13 o'clock 57 minutes which coincides with the condition of the time setting circuit 18, then the output pulses from converter 7 are sequentially applied to respective emitter electrodes of transistors 23, 24, 25 and 26, whereby these transistors are successively rendered conductive with a correct time sequence. Accordingly, the collector potentials of respective transistors are sequentially decreased and such decreases are simultaneously impressed upon the input terminals 36, 37, 38 and 39 of the logical circuit 35 by the action of the integrating circuit made up of resistors 27, 28, 29 and 30 and capacitors 31, 32, 33 and 34 which are connected to the collector electrodes of transistors 23, 24, 25 and 26, thus producing a timer output on the output terminal 40.

The integrating circuits described above respectively comprising the resistor 27 with the capacitor 31, the resistor 28 with the capacitor 32, the resistor 29 with the capacitor 33, and the resistor 30 with the capacitor 34 are provided for holding the input into the logical circuit 35.

Figure 2:
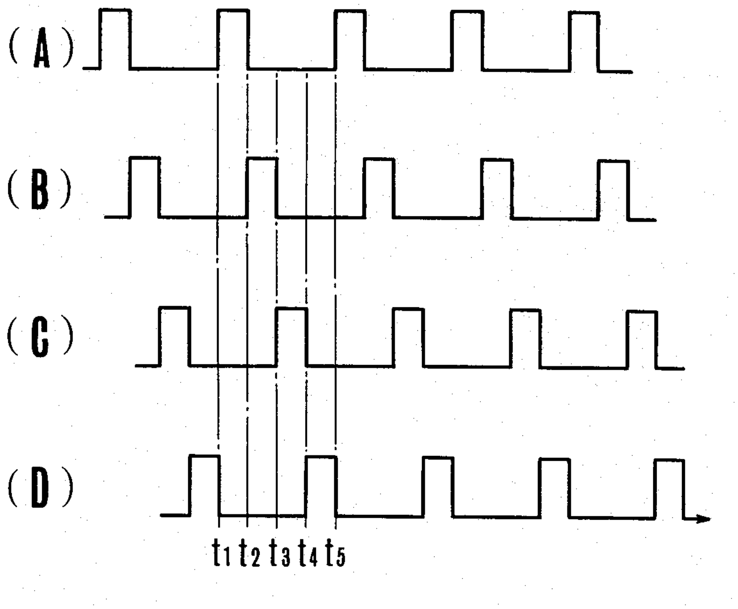
FIG. 2(A) through 2(D) is a series of are waveforms used to explain the operation of the timer device shown in FIG. 1.

When, as the time elapses, the time manually set on the timing setting circuit 28 and the time of clock circuit 1 coincide, according to the description above, transistors 23, 24, 25 and 26 are rendered conductive sequentially delayed by 15 seconds causing a voltage drop across the resistors 27, 28, 29 and 30 thereby resulting in a drop of voltage across respective capacitors 31, 32, 33 and 34 in that order. Since this drop of voltage across the capacitor forms an input signal to the logical circuit 35, the inputs are supplied to the four input terminals 36, 37, 38 and 39 and thus an output can be derived out. In this situation, since the clock signals of FIG. 2A through 2D corresponding to the 10 hours unit, the one hour unit, the 10 minutes unit, the one minute unit, as shown in FIG. 2, become extinct in 15 seconds, it is impossible to supply one set of four inputs to the logical circuit 35 within the period of one minute unless a holding circuit is provided. The time constant of the integrating circuit for holding the input supplied to the logical circuit 35 in response to the coincidence of the 10 hours unit is, therefore, the greatest and this is determined by the resistor 27 and the capacitor 31 of FIG. 1. In other words, the input to be impressed upon the input terminal 39 of the logical circuit 35 is held until an input is impressed upon the input terminal 36 of the logical circuit 35, and it is so arranged that the time constant determined by the resistor 28 and the capacitor 32, the resistor 29 and the capacitor 33, and the resistor 30 and the capacitor 34 respectively is smaller in that order.

By increasing the number of the movable contacts of the time setting circuit 18, the number of the discriminating transistors, and the number of the input terminals of the logical circuit 35, it is possible to accurately set a seconds unit in addition to the 10 hours unit, hours unit, 10 minutes unit and minute unit described above. Further, by increasing the number of sets, each consisting of a time setting circuit, discriminating circuit and a logical circuit, it is possible to provide a plurality of timer outputs at any time.

Thus, it will be clear that the invention provides an improved high accuracy timer device capable of accurately setting any time or plurality of times.

Although in the foregoing embodiment, a time represented by a binary number in the clock circuit is converted into a decimal number by means of a binary to decimal converter, and then the decimal number is compared with a condition set by a time setting circuit, it should be understood that the time expressed by a decimal number may be compared directly with the condition set by the time setting circuit or with the decimal output from the clock circuit. The type and connection of the discriminating transistors may be altered such that the polarity of the signal impressed upon these transistors is reversed. Where a logical output directly expressed by a decimal number is applied, a phase reversed signal represents the negation of the logical output.

Figure 3:
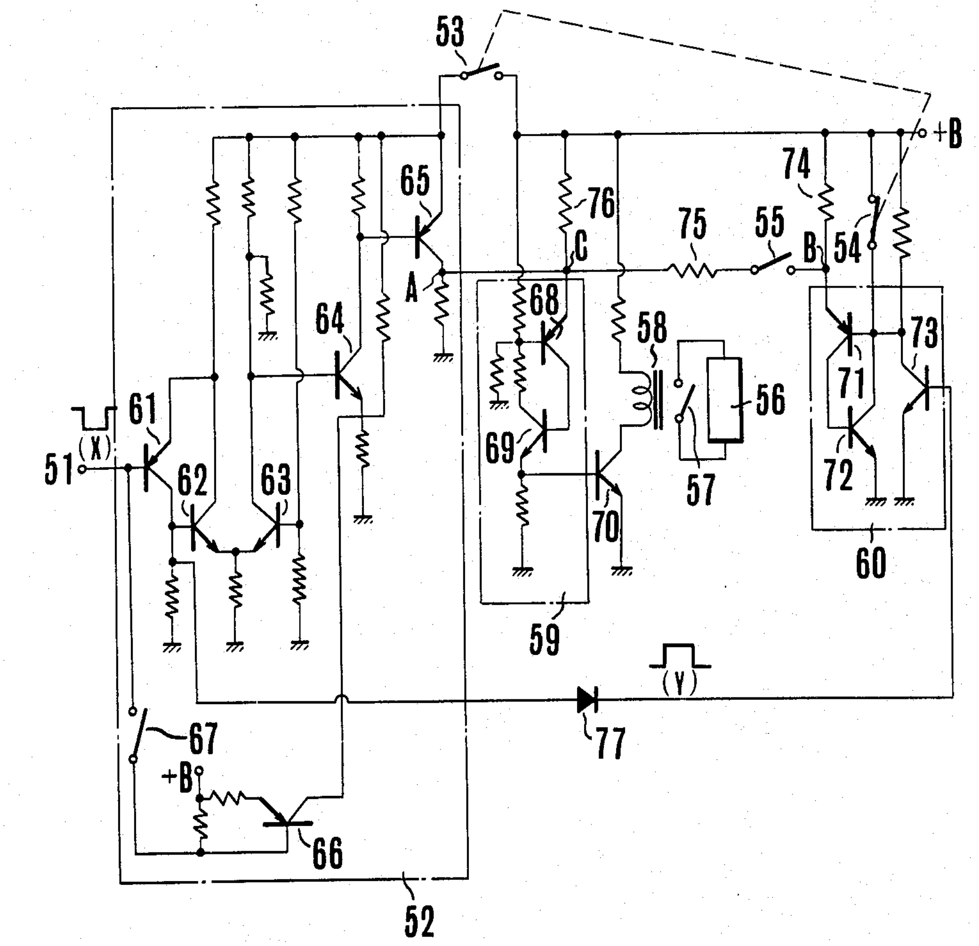
FIG. 3 is a detailed circuit diagram of the switching circuit employed in the system of FIG. 1 and controlled by the output from the timer device shown in detail in FIG. 1.

FIG. 3 shows a switching circuit controlled by the output from the timer device shown in FIG. 1. The switching circuit shown in FIG. 3 comprises an automatic switching circuit 52 having a input terminal 51 connected to receive the output appearing at the output terminal 40 of the logical circuit shown in FIG. 1, and automatic manual transfer switch 53 interlocked with a switch 54. These switches are interlocked such that when switch 53 is opened, switch 54 is closed and vice versa and together comprise a switch-over means for conditioning the switching circuit of FIG. 3 to either respond automatically to the output from the timer device of FIG. 1 or to be operated manually. There are also provided a manual switch 55, a load 56, a load switch 57, a relay 58 for operating the load switch 57, a first holding circuit 59 and a second holding circuit 60 which are constructed and arranged to be described later in detail.

The automatic switching circuit 52 comprises transistors 61, 62, 63, 64 and 66 and a switch 67 for connecting and disconnecting the load. The first holding circuit 59 comprises transistors 68 and 69 whereas the second holding circuit 60 comprises transistors 71, 72 and 73. Relay 58 is controlled by the output from the first holding circuit 59 through a transistor 70. Resistors 74, 75 and 76 are associated with transistors 71 and 68 of the second and first holding circuits 59 and 60 and a diode 77 is connected between the base electrodes of transistors 62 and 73.

In operation, when the circuit is set to manual operation by opening the manual-automatic transfer switch 53, the interlocked switch 54 is closed to apply the voltage of +B source to the base electrode of the transistor 71 of the second holding circuit 60, thus rendering nonconductive transistor 71. As a result, the second holding circuit 60 is rendered inoperative. Because switch 53 is opened to interrupt +B source, automatic switching circuit 52 is also rendered inoperative. As a result, the operation of the first holding circuit 59 and hence the operation of the load switch 57 are effected only by the operation of the manual switch 55. When this switch is opened, the voltage of +B source is impressed upon the emitter electrode of transistor 68 via resistor 76. However, the resistance value of resistor 76 is selected such that the emitter potential of transistor 68 will be lower than its base potential, so that transistors 68, 69 and 70 are rendered non-conductive thus deenergizing relay 58 to open the load switch 57.

Upon closure of the manual switch 55, the voltage of +B source is impressed upon the emitter electrode of transistor 68 through resistor 76, and through resistors 74, 75 and switch 55 so that the emitter potential of transistor 68 is increased beyond its base potential. Consequently, transistors 68, 69 and 70 are rendered conductive to energize relay 78, thereby closing the load switch 57.

When the automatic-manual transfer switch 53 is closed to set the circuit into automatic operation, so long as no control signal is applied to input terminal 51, and the interlocked switch 54 is opened, transistor 71 of the second holding circuit 60 tends to become conductive. However, because transistor 73 is maintained nonconductive, the second holding circuit 60 is maintained inoperative. Although the automatic switching circuit 52 is brought to a waiting condition, since no control signal is impressed upon input terminal 51, transistors 61 and 62 are held non-conductive, transistor 63 conductive and transistors 64 and 65 non-conductive. Thus, the automatic switching circuit 52 remains in its inoperative state exhibiting substantially the same condition as in the manual operation while switch 53 is opened.

However, the circuit is set for operation in the automatic condition by closing automatic-manual transfer switch 53 as described above. Under these conditions the automatic switching circuit 52 is brought into the operative condition upon a negative control signal as shown by X being impressed upon its input terminal 51. Assuming switch 67 of the automatic switching circuit 52 is opened at this time, then upon occurrence of the central signal X, transistors 61 and 62 are rendered conductive, transistor 63 non-conductive and transistor 64 conductive so that collector potential of transistor 64 and the base potential of transistor 65 is lowered thereby rendering conductive transistor 65. Consequently, the collector potential of transistor 65, or the potential of point A increases. As the potential of point A increases, the potential at point C increases beyond the base potential of transistor 68, thus rendering conductive transistor 68 in the first holding circuit 59. When transistor 68 is rendered conductive, transistor 69 is also rendered conductive to maintain the base potential of transistor 68 at substantially the ground potential. Accordingly, the first holding circuit 59 is maintained in the operative state and transistor 70 is rendered conductive to energize relay 58, thus closing the load switch 57.

The purpose of the second holding circuit 60 is to render ineffective the manual switch 55 so as to make the operation of the first holding circuit 59 independent of the operation of the manual switch 55 when a control signal is impressed upon the input terminal 51 to operate the automatic switching circuit 52. More particularly, as the transistor 61 of the automatic switching circuit 52 is rendered conductive, a phase inverted control signal Y will be applied to the base electrode of transistor 73 from the collector electrode of transistor 61 via diode 77. Consequently transistor 73 is rendered conductive to decrease the collector potential of transistor 73, and the base potential of transistor 71 is clamped to the ground potential. Under these conditions, since switch 54 is opened, transistors 71 and 72 are rendered conductive whereby transistor 72 continues to maintain the base potential of transistor 71 at the ground potential. As a result, the second holding circuit 60 can maintain its operation even when the phase inverted control signal Y disappears. When the second holding circuit 60 operates, the potential of point B will be reduced to the ground potential and this potential is applied to point C through the manual switch 55 and resistor 75 to be superposed upon the voltage of +B source which is impressed upon point C through resistor 76 and upon the voltage of point A. As above described, since the potential of point B is maintained at the ground potantial by the operation of the second holding circuit 60, the potential of point C is governed essentially by the potential of point A, that is the output from the automatic switching circuit 2. Thus, the potential of point C becomes quite independent of the operation of the manual switch 55.

After the automatic-manual transfer switch 53 has been closed to set the switching circuit into automatic operation, and a control signal is impressed upon input terminal 51 to operate the automatic switching circuit 52 in the above-described manner, and where a second manual control switch 67 is closed, transistors 61 and 62 of the automatic switching circuit 52 are rendered conductive and transistor 63 non-conductive so that the base potential of transistor 64 is increased tending to render transistor 64 conductive. However, at the same time, with switch 67 closed transistor 66 is rendered conductive by the control signal X applied to its base electrode from input terminal 51 via switch 67. Consequently the emitter potential of transistor 64 is made to be higher than the base potential thereby rendering transistor 64 non-conductive. As a result transistor 65 becomes non-conductive to decrease the potential of point A with the result that transistors 68 and 69 of the first holding circuit 69 are rendered non-conductive to render inoperative the first holding circuit 59, whereby transistor 70 is rendered non-conductive to open the load switch 57.

In the same manner as described above, at this time the phase inverted control signal is applied to the base electrode of transistor 73 from the collector electrode of transistor 61 via diode 77 to operate the second holding circuit 60 whereby the potential of point B is reduced to the ground potential. Consequently, the first holding circuit 59 is maintained in its inoperative state irrespective of the operation of the manual switch 55. In this manner, the load switch 57 is closed and opened by the opening and closing of second manual control switch 67 with the automatic switching circuit 52 set for automatic operation by closure of switch 53 and is independent of the condition of operation of the manual switch 55.

Instead of controlling the load switch 57 by relay 58, an electronic switching element such as a triode AC semiconductor switch or silicon controlled rectifier may be used to control switch 57, in which case the relay can be eliminated.

As described hereinabove, in accordance with this invention, when a control signal is impressed and the automatic switching circuit is conditioned for operation, it is possible to operate the load switch irrespective of the operation of the first manual switch. Further, even when the circuit is set to the automatic control of the operation of the load switch, it is possible to control the load switch by the operation of a second manual switch 67. As the switching circuit of this invention is fabricated with semiconductor elements, it is not only possible to decrease the size and weight of the switching circuit but also to prevent interference to other devices caused by leakage magnetic or electric field at the time of operation of the switching circuit. The life and reliability can be improved and the manufacturing cost can be reduced when compared with switching circuits using a plurality of mechanical relays.

With the switching circuit shown in FIG. 3 combined with the timer device as shown in FIG. 1, it is possible to control the source circuit for electrical machines and apparatus either automatically by the output of the timer device and/or by operation of the manual switch.

What is claimed is:

1. A control system comprising a combination of a timer device and a switching circuit, said timer device comprising clock circuit means for dividing a signal of predetermined time duration into a plurality of signals on the basis of time division and for sequentially producing said plurality of divided time signals at a plurality of output terminals, said plurality of divided time signals corresponding to a time indication, time setting circuit means for setting a desired time, and comparison means for sequentially comparing the time which is set by said time setting circuit means with the time indication represented by said plurality of time divided output signals from said clock circuit means and for producing an output upon the time indication represented by said clock circuit coinciding with the time setting of said time setting circuit means; and said switching circuit means comprising load switch means, manually operated switch means, automatic switching circuit means connected to receive said output of said timer device, first holding circuit means for controlling operation of said load switch means and controlled by either said manually operated switch means or said automatic switching circuit means, second holding circuit means for rendering the manually operated switch means ineffective to control operation of said first holding circuit means, switch-over means for selectively enabling either said automatic switching circuit means or said manually operated switch means to control operation of said first holding circuit means, and means for rendering said manually operated switch means ineffective by said second holding circuit means in response to the output from said timer device with the automatic switching circuit means being conditioned by said switch-over means to control operation of said load switch means whereby said first holding circuit means is controlled by the operation of said automatic switching circuit means and said load switch means is controlled by said first holding circuit means.

2. A control system according to claim 1 wherein said automatic switching circuit means further includes additional override manually operated switch means adapted to control said load switch means in conjunction with said first holding circuit means independently of the automatic switching signal output of said timer device and said first mentioned manually operated switch means.

3. A control system according to claim 1 wherein said clock circuit means includes means for dividing on time division basis a plurality of digits which represent 10 hours unit, one hours unit, 10 minutes and one minute units, respectively, into a plurality of time divided binary signals, means for generating a plurality of signals representing the order of said time divided binary signals, and binary to decimal converter means for converting said binary signals into decimal signals.

4. A control system according to claim 3 wherein said time setting circuit means comprises a plurality of input terminals connected to receive said decimal signal produced by said binary-to-decimal converter means and a plurality of manually operated switches for setting a time in terms of 10 hours unit, one hour unit, 10 minutes unit and one minute unit, respectively.

5. A control system according to claim 4 wherein said comparison circuit means comprises a plurality of transistors each having an emitter, base and collector electrodes, means to connect the emitter electrodes of said transistors with said plurality of manually operated time setting switches, respectively, means for applying to the base electrodes of said transistors said signals representing the order of the time divided binary signals generated by said clock circuit means, a plurality of integrating circuits respectively connected to the collector electrodes of said transistors, and a logic circuit connected to said plurality of transistors, said logic circuit producing an output only upon all of said transistors being rendered responsive to the preset time of the manually operated switches and the time divided signals generated by said clock circuit means.

6. A control system according to claim 5 wherein each of said integrating circuits comprises a resistor connected between one terminal of a source of supply and the collector electrode of each transistor, and a capacitor connected between the collector electrode of each transistor and the other terminal of said source.

7. A control system according to claim 1 wherein said switch-over means automatic-manual transfer switch means including a first transfer switch connected between said automatic switching circuit means and said first holding circuit means and a second transfer switch connected between a source of supply and said second holding circuit means, said first and second transfer switches being interlocked such that upon one of them being closed, the other is opened and vice versa.

8. A control system according to claim 7 which includes a diode connected between said automatic switching circuit means and said second holding circuit means for maintaining said manually operated switch means inoperative while said first holding circuit means and said automatic switching circuit means are conditioned to control operation of the load switch means.

9. A control system according to claim 8 wherein said manually operated switch means is connected between said first and second holding circuit means such that the operation of said first holding circuit means is controlled by said manually operated switch upon said automatic switching circuit means being rendered inoperative by said switch-over means.

10. A control system according to claim 9 wherein said automatic switching circuit means further includes additional override manually operated switch means adapted to control said load switch means in conjunction with said first holding circuit means independently of said automatic switching signal output from said timer device and said first mentioned manually operated switch means.

11. A control system according to claim 10 wherein said clock circuit means includes means for dividing on time division basis a plurality of digits which represent 10 hours unit, one hours unit, 10 minutes and one minute units, respectively, into a plurality of time divided binary signals, means for generating a plurality of signals representing the order of said time divided binary signals, and binary to decimal converter means for converting said binary signals into decimal signals.

12. A control system according to claim 11 wherein said time setting circuit means comprises a plurality of input terminals connected to receive said decimal signal produced by said binary-to-decimal converter means and a plurality of manually operated switches for setting a time in terms of 10 hours unit, one hour unit, 10 minutes unit and one minute unit, respectively.

13. A control system according to claim 12 wherein said comparison circuit means comprises a plurality of transistors each having an emitter, base and collector electrodes, means to connect the emitter electrodes of said transistors with said plurality of manually operated time setting switches, respectively, means for applying to the base electrodes of said transistors said signals representing the order of the time divided binary signals generated by said clock circuit means, a plurality of integrating circuits respectively connected to the collector electrodes of said transistors, and a logic circuit connected to said plurality of transistors, said logic circuit producing an output only upon all of said transistors being rendered responsive to the preset time of the manually operated switches and the time divided signals generated by said clock circuit means.

14. A control system according to claim 13 wherein each of said integrating circuits comprises a resistor connected between one terminal of a source of supply and the sollector electrode of each transistor, and a capacitor connected between the collector electrode of each transistor and the other terminal of said source.

* * * * *